US006976551B2

(12) United States Patent
Spanski

(10) Patent No.: US 6,976,551 B2
(45) Date of Patent: Dec. 20, 2005

(54) POWER-ASSIST SYSTEM AND METHOD FOR BICYCLES

(76) Inventor: Harold Spanski, 14418 SE. 284th, Kent, WA (US) 98042

( * ) Notice: Subject to any disclaimer, the term of this patent is extended or adjusted under 35 U.S.C. 154(b) by 126 days.

(21) Appl. No.: 10/034,315

(22) Filed: Dec. 28, 2001

(65) Prior Publication Data

US 2002/0084128 A1 Jul. 4, 2002

Related U.S. Application Data

(60) Provisional application No. 60/258,935, filed on Dec. 29, 2000.

(51) Int. Cl.[7] .................. B62M 23/02; B62K 11/00
(52) U.S. Cl. .................................... 180/207
(58) Field of Search .................. 180/205, 206, 180/207

(56) References Cited

U.S. PATENT DOCUMENTS

| 833,584 A | 10/1906 | Cress | |
|---|---|---|---|
| 4,044,851 A | 8/1977 | Shaw et al. | |
| 4,280,581 A * | 7/1981 | Rudwick | 180/207 |
| 4,346,777 A | 8/1982 | Restelli | |
| 4,871,042 A | 10/1989 | Hsu et al. | |
| 5,370,200 A | 12/1994 | Takata | |
| 5,505,277 A * | 4/1996 | Suganuma et al. | 180/206 |
| 5,845,727 A * | 12/1998 | Miyazawa et al. | 180/205 |
| 5,909,781 A * | 6/1999 | Yonekawa et al. | 180/206 |
| 6,276,479 B1 * | 8/2001 | Suzuki et al. | 180/207 |
| 6,296,072 B1 * | 10/2001 | Turner | 180/220 |
| 6,554,730 B1 * | 4/2003 | Sakai et al. | 475/195 |

* cited by examiner

Primary Examiner—Kevin Hurley
(74) Attorney, Agent, or Firm—Robert B. Hughes; Hughes Law Firm, PLLC

(57) ABSTRACT

A power-assist system for a bicycle by which the bicycle can be operated in various modes. There is a pedal-alone mode, a power-assist mode, a combined pedaling and power-assist mode, and a coasting mode. An overriding clutch is positioned between the pedal section and the sprocket, and a second overriding clutch is positioned between a speed reducing gear section, driven by a motor, and a power-assist shaft located in the crank housing.

9 Claims, 10 Drawing Sheets

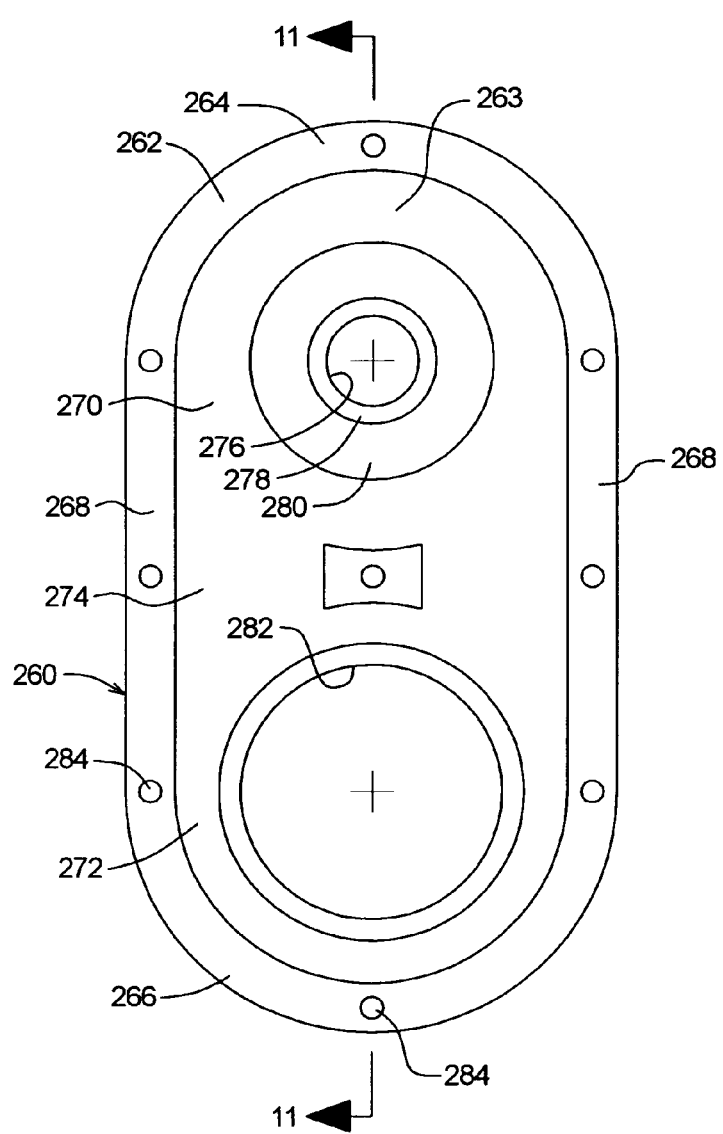
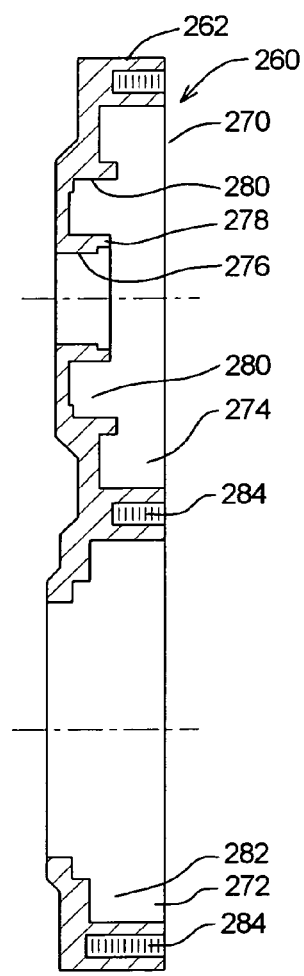
FIG. 10
FIG. 11

POWER-ASSIST SYSTEM AND METHOD FOR BICYCLES

RELATED APPLICATIONS

This application claims priority benefit of U.S. Provisional Ser. No. 60/258,935, filed Dec. 29, 2000.

FIELD OF THE INVENTION

The present invention relates to a power-assist apparatus and a method for bicycles, and more particularly to such an apparatus and system which can be adapted readily to present day bicycle designs, and which could be provided in the form of a retrofit kit.

SUMMARY OF THE INVENTION

The pedal and power-assist motor system of the present invention enables the bicycle to be operated in four operating modes, namely (1) a power-assist mode where a bicycle rider is pedaling to supply power, and the power-assist section is providing power; (2) a pedal-only mode where power is being supplied solely by pedaling the bicycle; (3) the power-assist-only mode where the bicycle rider is not providing power by pedaling, but power is supplied by the power output section; and (4) a coasting no-power mode where the bicycle is traveling with the pedal section stationary, and no power is being supplied by either the pedal section or the power-assist drive section.

A bicycle for which the present system is adapted can be basically conventional, having front and rear ends, first and second sides, at least one drive wheel, and a bicycle frame with front and rear ends. This system comprises a pedal section which in turn comprises first and second pedal members, a crank shaft connecting the pedal members, and a crank housing in which the crank shaft is located.

There is a sprocket section having a chain and sprocket drive connected to the drive wheel. There is a motor section that is connected to a speed reducing gear section which has a gear section drive output.

There is also a power-assist drive section comprising a power-assist drive member having a power-assist drive connection between the gear section drive output and the sprocket section.

The system is characterized in that the sprocket section has a first pedal overrunning drive connection with said pedal section, and the power-assist drive connection has a second overrunning drive section.

In the preferred configuration, the power-assist drive member is concentrically mounted around said crank shaft. Also in a preferred configuration, the power-assist drive member has a fixed drive connection to the sprocket section and the power-assist overrunning drive connection is between the power-assist drive member and the gear section drive output.

Desirably, the sprocket section and the first pedal member are nearer to the second side of the frame, and the power-assist drive member has a second end portion that connects to the sprocket drive, and a first end portion that is near to the first side of the frame. The first end portion connects through the power-assist overrunning drive connection to the gear section drive output.

Also, in the preferred configuration, the power-assist drive member has a tubular configuration with first and second power-assist member portions on opposite sides of the bicycle, and the power-assist drive member and the crank housing are positioned concentrically around the center axis of the crank shaft. The second end portion of the power-assist drive member has a fixed power connection to the drive sprocket, and the first end portion of the power-assist drive member connects with the gear section drive output through said power-assist overrunning drive connection.

In a preferred embodiment shown herein, a power-assist drive member is rotatably mounted on bearings that have an operative load bearing relationship with the crank housing. The crank shaft is at least partly supported by bearings in load bearing relationship with the power-assist drive member so that the power assist drive member and the crank shaft are rotatable relative to one another.

The motor is desirably a high speed motor that is driven by petroleum based fuel and operates at at least 1000 RPMS. The motor has a sheave and belt drive connection with the speed reducing gear section. Thus, tension force is exerted and the sheave and belt drive from the motor to the speed reducing gear section are substantially less than forces imposed in the drive connection between the speed reducing gear section and the power-assist drive member.

A preferred location of the motor is to be located proximate to an upper rear portion of the frame. Also, the speed reducing gear section is desirably located closely adjacent to the crank housing of the bicycle, so that a first distance form the motor to the speed reducing gear section is substantially greater than a distance from the speed reducing gear section to the crank housing.

In an alternative embodiment, the motor is an electric motor which is mounted closely adjacent to the speed reducing gear section.

The configuration of the speed reducing gear section comprises a center drive shaft having an offset drive portion on which is rotatably mounted an orbiting cluster gear section that rotates in an orbiting motion to produce a rotational speed reduction ratio at least as great as 20 to 1. More desirably, the rotational speed reduction is at least as great as 40 to 1.

In the method of the present invention, the power-assist drive member and the crank shaft are positioned in the crank housing with first and second end portions of each of the power-assist drive member and of the crank shaft being adjacent to first and second end portions of the crank housing.

There is also provided the speed reducing gear section and the sprocket section, and a drive connection is made from the speed reducing gear section through the power-assist drive member to the sprocket section, with this drive connection being an overrunning drive connection.

There is also provided an overrunning drive connection operably connected between the crank shaft and the sprocket connection.

The first and second pedal members are attached to the first and second end portions of the crank shaft, and the high speed motor is connected to the speed reducing gear transmission.

In one preferred form, the speed reducing gear section and the power-assist drive member are arranged as a preassembled unit, and the power assist drive member is positioned in the housing with the power-assist drive being connected to the speed reducing gear section. This connection is desirably provided by means of a housing connecting structure that has an intermediate chamber. The speed reducing gear section and the power-assist drive member have a drive connection located in said intermediate chamber.

Also in the method of the present invention, end adapters are positioned in first and second ends of the crank housing and rotatably support the power-assist drive member.

The invention further comprises operating a bicycle by pedaling and also utilizing power-assist in accordance with the present invention.

More specifically, the method comprises pedaling the first and second pedal members to rotate a crank shaft to in turn drive the sprocket section of the bicycle through the overrunning drive connection.

The method further comprises providing the power-assist of operating the motor at a relatively high rotational speed to provide power input to the speed reducing gear transmission to rotate the power-assist drive member located in the crank housing of the bicycle. In turn, the drive power is transmitted to the sprocket section, with the speed reducing gear section providing driving force through the power-assist drive member and to the sprocket by means of the overrunning drive connection.

Also, the present invention further comprises a retrofit assembly to provide for the bicycle and power-assist drive assembly. This assembly comprises a motor section, a speed reducing gear section, a power-assist drive section, a first pedal overrunning clutch member, and a second power-assist overrunning clutch member. These are configured and operate in a manner disclosed previously in this text and also as described more completely in the following text of the application.

It is believed that other features of the present invention will become apparent from the following detailed description.

BRIEF DESCRIPTION OF THE DRAWINGS

FIG. 10 is a plan view of a housing structure of the third embodiment that interconnects the speed-reducing gear section and also the power-assist output section of the third embodiment, and also encloses the drive chain extending between those two sections; and FIG. 11 is a sectional view taken along line 11—11 of FIG. 10, also showing the housing structure of the third embodiment.

DETAILED DESCRIPTION OF THE PREFERRED EMBODIMENTS

Figure 1:
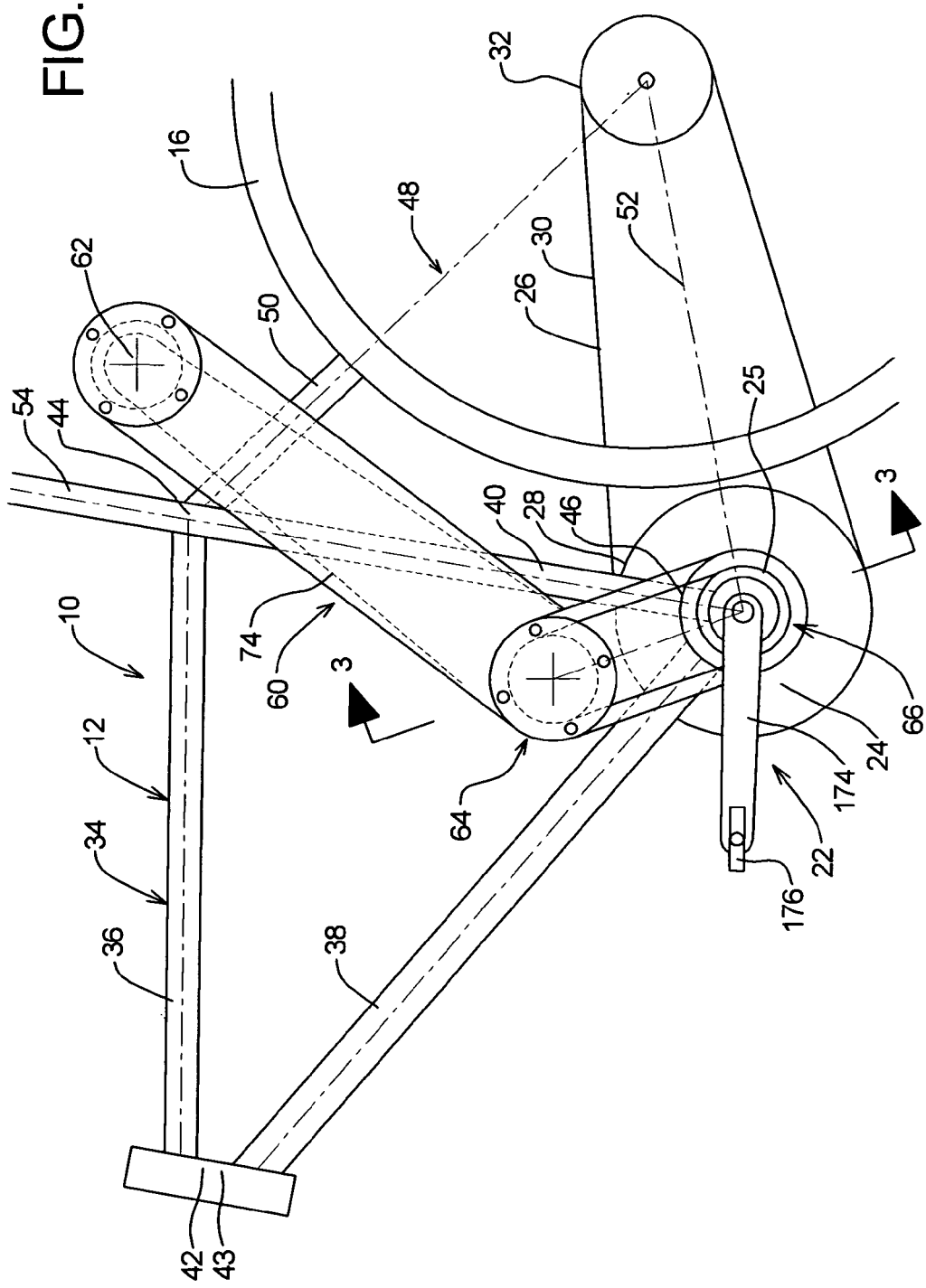
FIG. 1 is a side elevational view of a conventional bicycle incorporating the power-assist system of the present invention.
Figure 2:
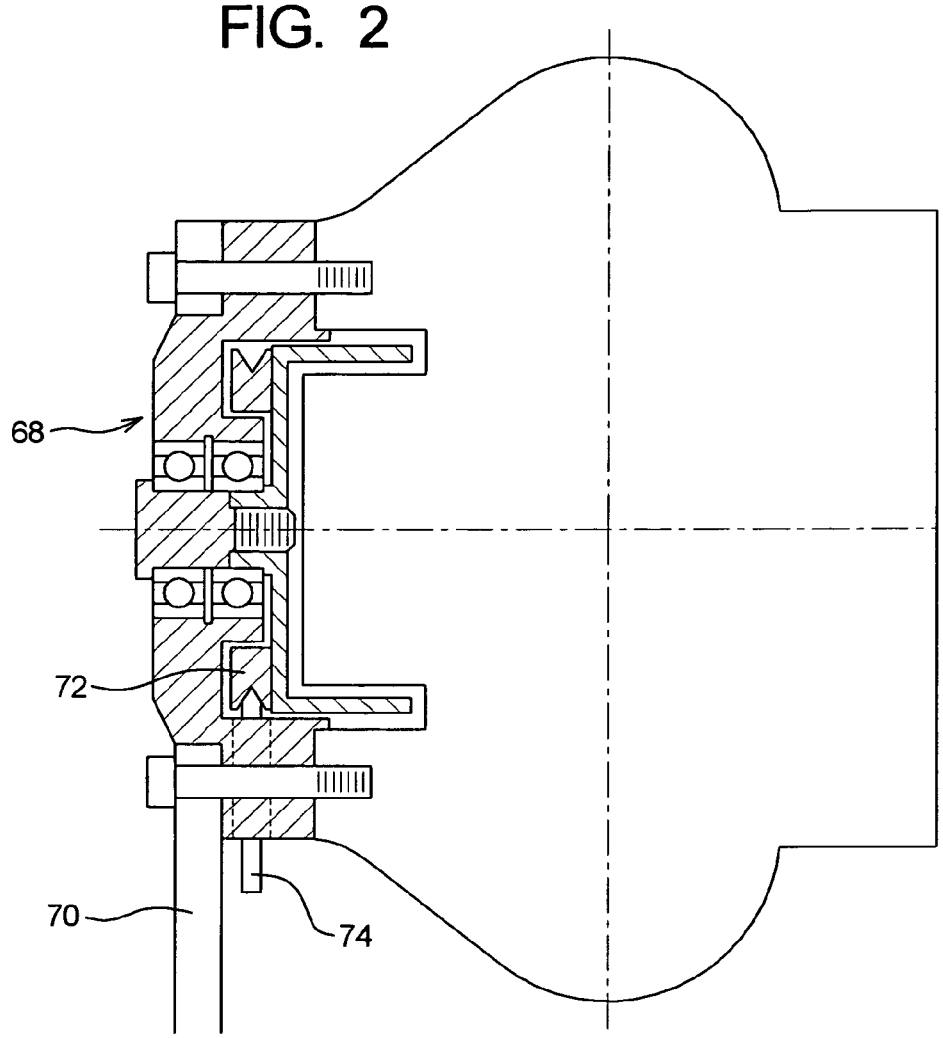
FIG. 2 shows the motor section of the present invention.

In FIG. 1, there is shown a bicycle 10 which comprises a frame 12, front and rear wheels 14 and 16, a handlebar 20, and a drive section 22, comprising a pedal section 24 mounted to a crank housing 25, and a sprocket section 26. The sprocket section in turn comprises a forward sprocket section 28, a drive chain 30, and a rear sprocket section 32.

The frame 12 in turn comprises a central frame section 34, which in turn comprises an upper horizontal frame member 36, a front downwardly and rearwardly slanting frame member 38, and a back frame member 40. The frame members 36 and 38 meet at a front connecting location 42 to connect to the mounting sleeve 43 of the steering column; the upper frame member 36 and the back frame member 40 meet at a back connecting location 44; and the front lower frame member 38 and the back frame member 40 connect to the crank housing 25 at a lower connecting location 46.

There is also a rear frame section 48 comprising an upper forked frame member 50 and a lower forked frame member 52. The rear ends of these two frame members 50 and 52 meet at the location of the rear sprocket section 32. The upper forward end portion of the upper frame member 50 connects to the back frame member 40 at approximately the connecting location 44. The forward end of the lower rear frame member 52 has a connection to the central frame section 34 at the lower connecting location 46. There is a seat post 54 extending upwardly from the bottom the back frame member 40, and as is common in the prior art, this seat post 54 can comprise a separate post member telescopically mounted in the back frame member 40.

It is to be understood that the components described above already exist in the prior art. The present invention is designing so that it can be readily adapted to be incorporated in a typical bicycle configuration, such as described above.

With further reference to FIG. 1, there are shown the main components of the power-assist apparatus 60 of the present invention. These comprise three main sections, namely: a motor section 62, a speed-reducing gear section 64, and a power-assist output section 66 (hereinafter called the "power-assist section 66")

It is believed that a clearer understanding of the present invention will be achieved by first identifying the four main operating modes of the apparatus of the present invention. After that, they will be a more detailed description of these components and their operation. The main operating modes are as follows:

a) the power-assist mode (where the bicycle rider is pedaling to supply power, and the power-assist section 66 is providing power);

b) b) the pedal only mode (where power is being supplied solely by pedaling the bicycle);

c) the power-assist only mode (where the bicycle rider is not providing any power by pedaling, and all the power is supplied by the power output section; and d) a coasting no-power mode where the bicycle is traveling with the pedal section stationary, and no power is being delivered either by the pedal section or the power-assist drive system.

The motor section 62 comprises a motor 68 mounted to an upper mounting plate 70, having a power output sheave 72 which engages a drive belt 74. In this preferred embodiment, the motor 68 is a gasoline powered motor having a power output of, for example, 1 ½ horsepower, and capable of operating at 4000 RPM, and possibly as high as 8000 RPM. Alternatively, the motor 68 could be an electric motor, also capable of operating at 4000 RPM or possibly higher. Further, the motor 68 could be mounted to the bicycle frame 12 directly. Within the broader scope, the RPM could conceivably range from 1000, 1500, 2000, 2500, 3000, 3500, or 4000, up to higher ranges such as 4500, 5000, 5500, 6000, 4000, 8000, 9000, 10,000, 11,000, or 12,000 RPM. The horsepower could obviously vary from one-half (or below one-half), three-quarters, 1.0, 1.75, 2.0, 2.5, or 3.0 or higher. There are design options available to possibly meet certain applications or requirements, or possibly to take advantage of improvement in power sources, etc.

The speed-reducing gear section 64 comprises a gear section housing 76, a power input component 78, a speed-reducing gear assembly 80, and a power output component 82. The housing 76 in turn comprises an input end 84 at which there is an input housing section 86, and an output end 88 having an output housing section 90. These two housing sections 86 and 90 are connected at perimeter portions thereof by bolts 92. The housing 76 has a longitudinal center axis 94.

In the following description, the term "rear" shall denote a location at, or proximity to, the input housing section 86, and the term "front" or "forward" shall denote a location at, or proximity to, the output housing section 90.

The housing section 86 has an end plate 96 which has a frusto-conical configuration, and a cylindrically shaped perimeter portion 98 which extends forwardly from the perimeter of the end plate 96. The housing section 90 comprises a disc shaped end plate 100, and a perimeter portion 102, extending from the perimeter of the end plate 100 rearwardly. The aforementioned bolts 92 extend through the perimeter portion 102 to connect to the perimeter portion 98. Positioned between the two perimeter portions 98 and 102 is the upper end of a mounting plate 104, the lower end of which is connected to the aforementioned crank housing 25. The bolts 92 extend through this mounting plate 104 to attach it rigidly to the housing 76. The aforementioned mounting plate 70 can be connected to this mounting plate 104 or be made integrally therewith.

The power input component 78 comprises an input sheave 106 which has a perimeter belt engaging grooved portion 108 and a frusto-conical body portion 110. The sheave 106 has a threaded center opening 112 which connects to a rear input end portion 114 of a longitudinally extending input shaft 116 rotatably mounted about the longitudinal axis 94. The rear portion of the input shaft 116 is supported in the rear housing section 86 by a rear end bearing 117. The shaft 116 has at its rear end a counterweight 118 and at its forward end a second counterweight 120. The front end 122 of the shaft 116 is mounted in an end bearing 124. A rear seal 125 is positioned between the shaft 116 and the housing section 86.

At the longitudinal center portion of the shaft 116, the shaft 116 is formed with a cylindrically shaped eccentric drive portion 128 having an outer cylindrical surface 130 which is concentric with an offset center axis 132 of the eccentric drive portion 128. As the shaft 116 rotates, the offset center axis 132 orbits about the longitudinal center axis 94.

The aforementioned speed-reducing gear assembly 80 comprises a cluster gear section 136 mounted by rear and front bearings 138 and 140 to the drive portion 128 so as to be concentric with the offset center axis 132. The cluster gear section 136 comprises a first rear gear portion 142 and a second forward gear portion 144. The first gear portion 142 is positioned within a surrounding fixed ring gear 146 mounted in the perimeter portion 98 of the rear housing section 86. The first gear portion 142 has a pitch diameter moderately smaller than the inside pitch diameter of the fixed ring gear 146. With the first gear portion 142 being concentric with the offset axis 132, and with the first gear portion engaging the ring gear 146, as the shaft 116 rotates about the longitudinal axis 94, the gear portion 142 has a rotating motion about the offset axis 132 and also has an orbital movement about the longitudinal axis 94.

Adjacent to, and just forwardly of, the fixed ring gear 146, there is a rotatably mounted ring gear 148 mounted within a bearing 150 which surrounds the ring gear 148 and is positioned within a forward cylindrical extension 152 of the fixed ring gear 146. There is a perimeter seal 154 forward of the ring gear 148. Positioned within this rotatably mounted ring gear 148 is the aforementioned forward cluster gear portion 144. The outside diameter of this forward cluster gear portion 144 is moderately smaller than the inside diameter of the rotatable ring gear 148. Thus, with the first and second gear portions 142 and 144 being fixedly connected with one another, the rotation of the cluster gear section 136 causes the rotation of the rotatable ring gear 148. The diameters of the first and second gear portions 142 and 144 and the inside diameters of the ring gears 146 and 148 are selected so that the speed reduction ratio is in the range of about 45:1 or 50:1, or, more broadly, possibly as low as 40:1, 35:1, or 30:1, or conceivably lower, or possibly as high as 55:1, 60:1, 65:1, 90:1, 75:1, 80:1, 100:1, 125:1, 150:1, 200:1, or higher.

The aforementioned output component 82 comprises an output housing 156 having a rear cylindrical portion 157 that is a forward extension of the ring gear 148 and fixedly connected thereto. This cylindrical portion 157 in turn connects to an inwardly stepped portion 158 that extends further forwardly to connect to an end plate 160. The two portions 157 and 158 and the end plate 160 can be formed integrally with one another. There is an output bearing member 162 mounting the output housing 156 to the forward housing section 90. The inwardly stepped housing portion 158 supports the front end of the shaft 116 by means of the aforementioned bearing 124.

The final output member is an output gear 164 which is mounted to the output housing 156 so as to be positioned around the housing portion 158 and just forwardly of, and in contact with, the housing portion 157. The upper end of a drive chain 168 engages the output sprocket 164 and extends downwardly therefrom to come into drive engagement with the power-assist section 66. The foreword housing section 90 is provided with through openings to accommodate the drive chain 168 so that it can extend through the housing section 90 to connect to the power-assist output section 66.

Before describing the power-assist output section 66 in detail, it would be helpful to review briefly the existing drive section 22. As described briefly above in this text, this drive section 22 comprises the pedal section 24 and the drive sprocket section 26 that in turn comprises the forward sprocket section 28, a drive chain 30, and the rear sprocket section 32. In incorporating the present invention in a conventional bicycle, the existing power section remains substantially the same, but with a few modifications.

Thus, there remains the existing crank housing 25, and there is a pedal section crank shaft 170 positioned in the crank housing 25. There are right and left crank arms 172 and 174, respectively, and a foot pedal 176 is attached to the end of each crank arm 172 and 174. At the right end of the crankshaft there is a hub 178 to which is mounted a pedal driving freewheeling clutch 180 comprising an inner clutch member 182 connected to the hub 178 and an outer clutch member 184 which is connected to the forward sprocket section 28, for example, by bolts, such as shown at 186.

The freewheeling clutch 180 is arranged so that when the bicycle rider is pedaling to move the bicycle forward under power, the two clutch members 182 and 184 are engaged in drive relationship. However, when the forward sprocket section 28 is rotating faster than the crank shaft 170 or rotating while a pedal section 24 is stationary, the outer clutch member 184 will rotate freely.

To turn our attention now to the power-assist section 66, there is a second freewheeling clutch 188 and a power-assist shaft 190 (also called a carrier shaft), having a left end portion to which the clutch 188 is connected. This power-assist shaft 190 has a tubular cylindrical configuration and concentrically surrounds the crank shaft 170. This clutch 188 has an outer clutch portion 192 which is provided with gear teeth 194 that engage the aforementioned drive chain 168 so that the outer clutch portion 192 functions as a sprocket 194.

The clutch 188 has an inner clutch member 196 which is mounted to a left end portion 198 of the shaft 190 which end portion 198 has a diameter larger than that of the main portion of the shaft 190. A bearing member 200 is positioned in this left end portion 198 to provide support for the left end of the crank shaft 170. Positioned concentrically around the shaft 190 immediately to the right of the clutch 188 and fixedly connected to the left end of the crank housing 25 is an adapter member or adapter 204. This member 204 comprises a radially outwardly extending flange 206 and a latterly outwardly extending cylindrical flange 208, and these two flanges 206 and 208 engage the aforementioned mounting plate 104 which has a through opening by which it is mounted to the flange 206, with the side surface of the mounting member 104 engaging the flange 208. The adapter member 204 also has an inwardly extending cylindrical flange 210 which has outer threads to enable it to thread into the left end of the crank housing 25.

At the right end of the crank housing 25, there is a right adapter member 212, which comprises an inwardly extending cylindrical connecting portion 214 which has external threads which engage the inner threaded surface portion of the right end portion of the crank housing 25. The adapter member 212 also comprises a radially extending flange portion 216 that connects to an outwardly extending cylindrical flange portion 218 within which is positioned a bearing member 220 to provide support for the right end portion of the power-assist shaft 190.

Connected to the right end of the power-assist shaft 190, there is a sprocket connecting member 222 which comprises an inwardly extending cylindrical connecting member 224 having interior threads to engage the right end portion of the power-assist shaft 190. This connecting member 222 has an outwardly stepped portion 226 inside of which is an inner bearing member 228 to provide support for the right end portion of the crank shaft 170, and outside of which is the aforementioned outer bearing member 220 to provide support for the right end portion of the power-assist shaft 190.

The sprocket connecting member 222 further comprises a sprocket mounting portion 230 which has fixedly attached thereto (or made integrally therewith) the members 232,234, and 236 to which the sprocket rings 238,240 and 242 are mounted.

To describe the operation of the present invention, let us assume first that the rider is on the bicycle and pedaling the bicycle under power, without any power-assist. As the crank arms 172 and 174 rotate to cause rotation of the crankshaft 70, the inner clutch member 182 is in engagement with the outer clutch member 184 so that the forward sprocket section 26 rotates to deliver power to the rear wheel 16.

At the same time, the power-assist shaft 190, being fixedly connected to the forward sprocket section 26, also rotates at the same speed as the crankshaft 170. With the power-assist apparatus 60 non-operating, the outer clutch member 192 of the freewheeling clutch 188 is not rotating, but the inner clutch member 196 is free to rotate. Thus, in this operating mode (i.e. the pedal-only mode), there is no rotation of the components of the bearing members 200 and 228 Nor is there any relative rotation of the clutch members 182 and 184 of the clutch 180. There is rotation of the components of the bearing members 202 and 220, and also the two clutch components 196 and 192 which are freewheeling.

Now let us assume that the bicycle 10 is starting to go up the hill, and the rider wants to have the power-assist operating. The motor 62 would be started, and control lever for the throttle of the motor 62 would be positioned at a convenient location, such as at the handlebar. As the speed of the motor 62 increases, the speed of rotation of the output sprocket 164 also increases, and at such time as the rotational speed of the outer sprocket member 194 matches rotational speed of the power-assist shaft 190, the clutch members 192 and 196 will be in driving engagement, so that power is delivered from the motor 62 to the power-assist shaft 190 into the forward drive sprocket 26. Thus, the rider would still be pedaling and would still be exerting a drive force through the pedal assembly, while the power-assist apparatus 60 would be providing additional power to maintain the desired bicycle speed up the hill. Thus, the power-assist cannot forcibly drive the pedal crank arms, this providing a substantial safety factor.

Now let us assume that the bicycle rider has reached the top of the hill and is traveling over a level pathway or road. If the rider is feeling some fatigue and wishes to take a "breather", the rider can simply stopped pedaling. In this instance, the motor section 62 would still be operating, and power would still be delivered to the power-assist shaft 190. The clutch 188 would be operating in its drive mode, while the clutch 180 would be operating in its freewheeling mode. Thus, the power assist cannot forcibly drive the pedal crank arms, this providing a substantial safety factor.

Now, let us assume the bicycle is coasting downhill without any power assist and with the pedals 176 stationary. In this operating mode, both of the clutches 180 and 188 are freewheeling.

Also, it should be recognized that another advantageous feature is that with the motor 68 being operated at a very high RPM, the torque of the output of the motor 68 is relatively very small compared to the torque at the output of the speed-reducing gear section. Thus, the tension force on the drive belt 74 is relatively very low, and this simplifies the design of the drive from the motor 68 to the speed-reducing gear section 64.

Figure 3:
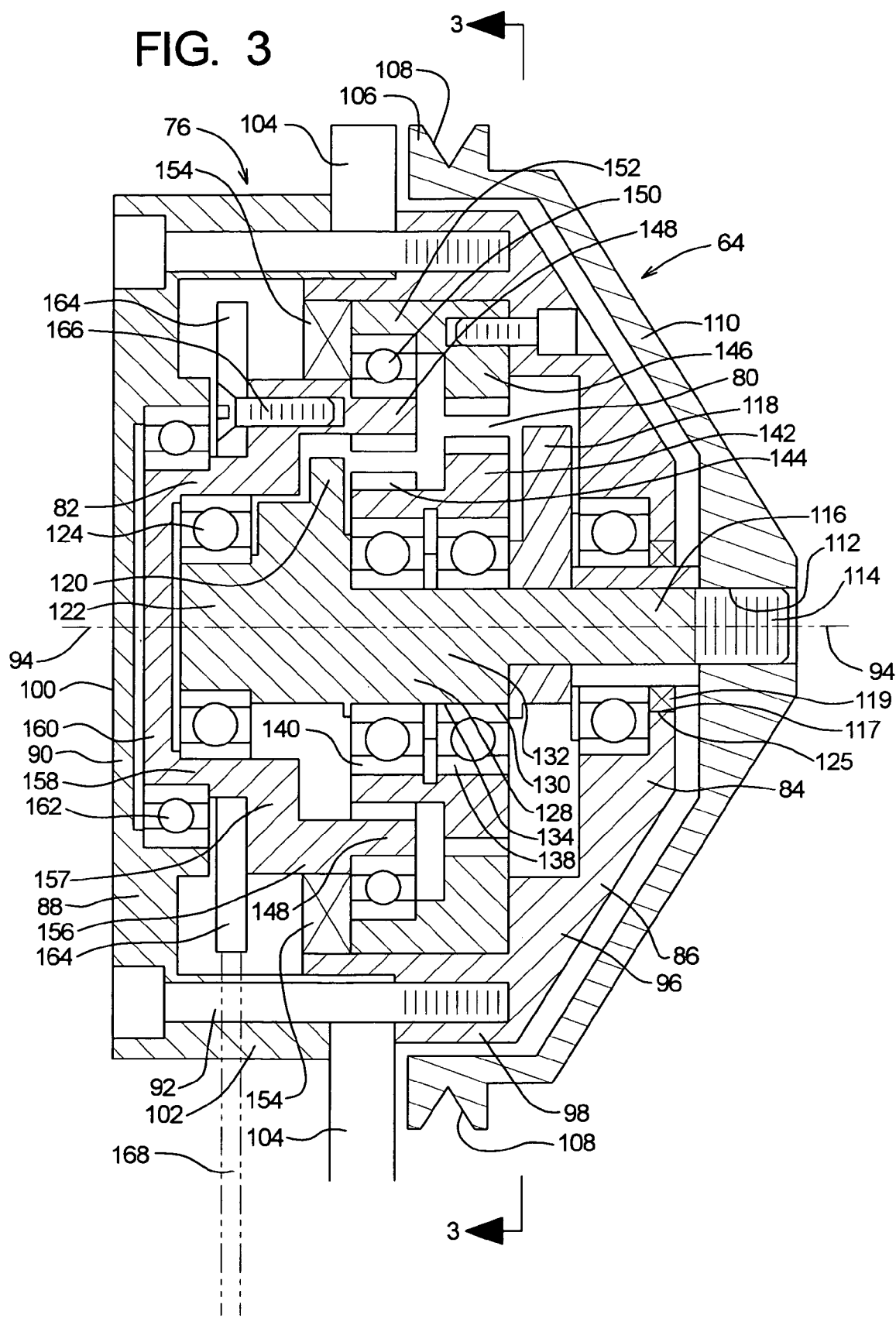
FIG. 3 is a cross sectional view taken a long line 3—3 of FIG. 1, showing the speed-reducing gear section of the present invention.
Figure 4:
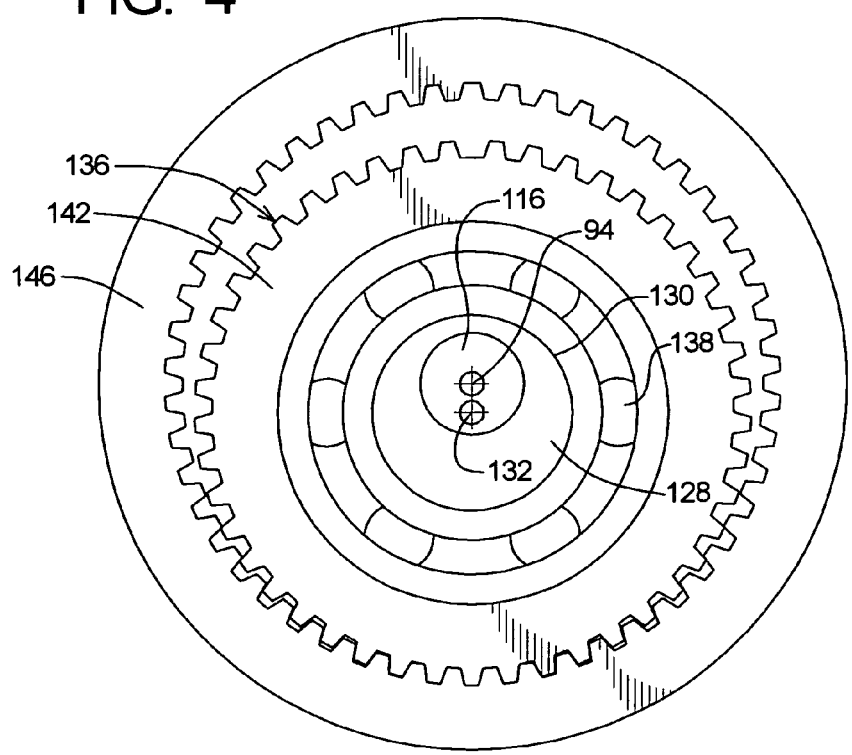
FIG. 4 is a cross sectional view taken a long line 4—4 of FIG. 3, showing a portion of the speed-reducing gear assembly of the speed-reducing gear section.
Figure 5:
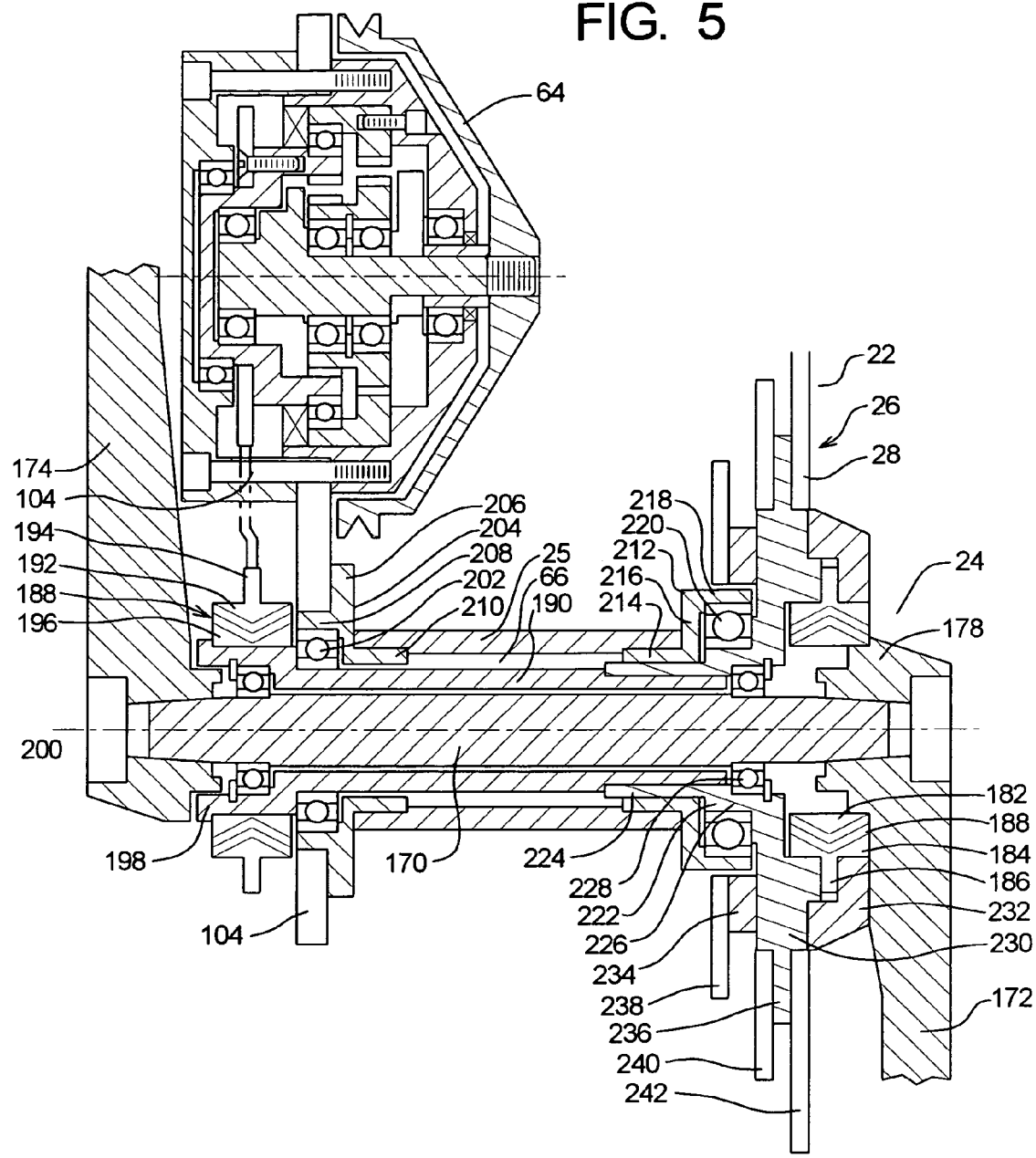
FIG. 5 is a cross sectional view of the power-assist output section of the present invention.

FIG. 3 is drawn very closely to scale and shows approximately the actual size of the components. The crank housing 25 is the same size as those of present-day bicycles. It may be that the bicycle in which the present invention is to be incorporated would have a crankshaft of too large of a diameter so that it could not be positioned inside of the power-assist shaft 190. In those instances, it would quite possibly be prudent to supply the pedal assembly as part is a retrofit kit.

Figure 6:
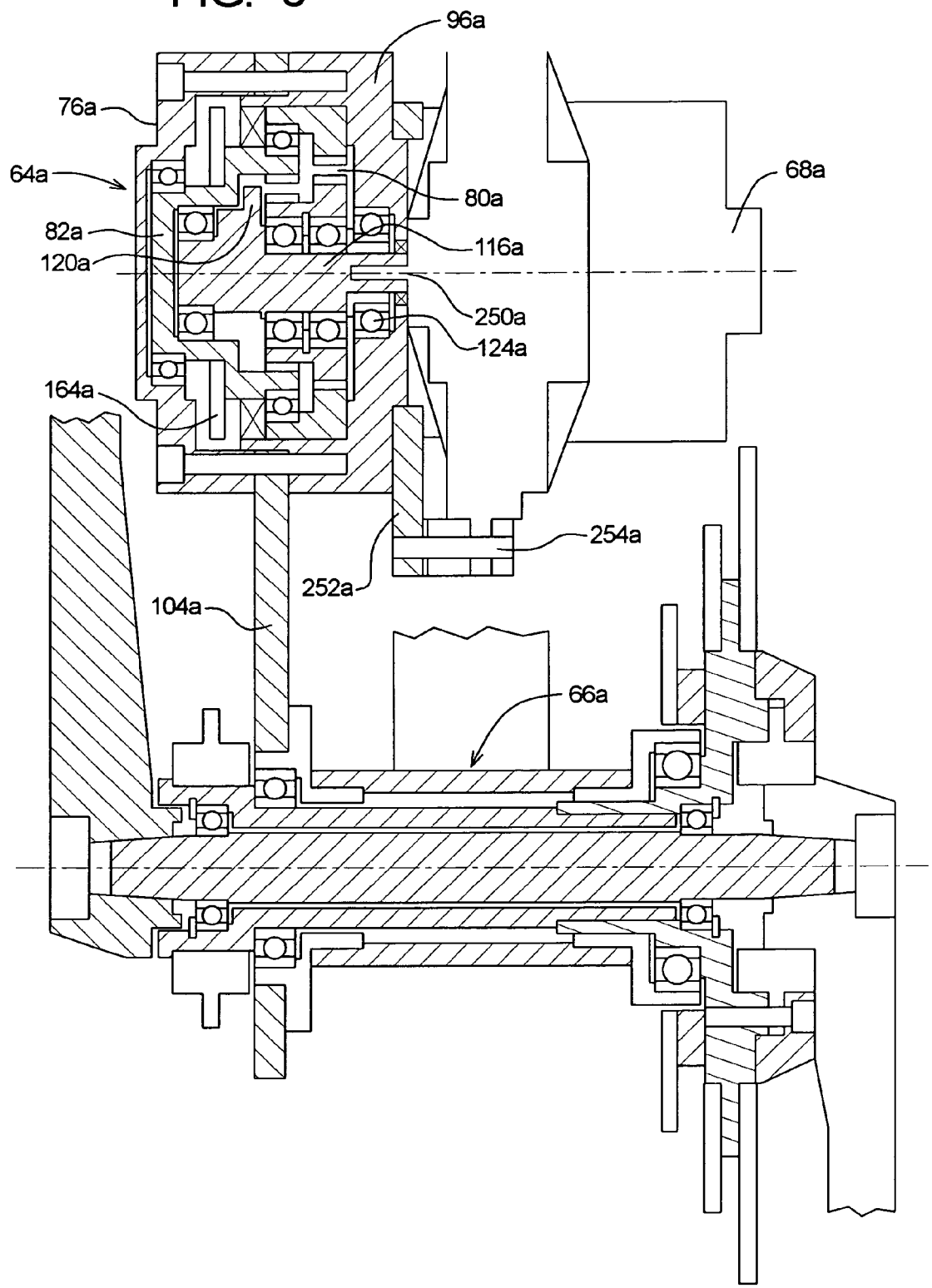
FIG. 6 is a cross sectional view showing both the power-assist speed-reducing gear section and the power-assist output section.

The second embodiment of the present invention is shown in FIG. 6. In describing this second embodiment, components which are similar to, or the same as, the first embodiment, will be given like numerical designations, with an "a" suffix distinguishing those of the second embodiment.

In this second embodiment, instead of using the gasoline drive motor at the upper rear location to supply power, there is an electric motor at the location of the speed-reducing gear section. The gasoline motor 68, the mounting plate 70, the output sheave 72, and the drive belt 74 are eliminated from this second embodiment. Instead, there is provided an electric motor 68a which is mounted directly to the speed-reducing gear section 64a.

In examining FIG. 6, it can be seen that in the second embodiment, the following components of the speed-reducing gear sections 64a are substantially the same as in the first embodiment, these being the following: speed-reducing gear assembly 80a, the power output component 82a, the input shaft 116a, the forward counterweight 120a (the optional counterweight 118 of the first embodiment not being used), the end bearing 124a, the mounting plate 104a, and finally, the output gear 164a. For the sake of brevity, the various other components or elements that are shown in FIG. 6 will not be designated or described, since this is evident from a review of the text relating to the first embodiment. Also, it will be noted that the power assist section 66a of this second embodiment is the same as (or at least substantially the same as) the power assist section 66 of the first embodiment, so this will not be described in detail. It can be seen that the output shaft 250a of the electric motor 68a is connected directly to the input shaft 116a. The input shaft 116a and the speed-reducing gear assembly 80a operate in the same manner as described previously, and thus, the power output component 82a drives the output gear 164a to supply power to the power assist section 66a.

Since the electric motor is connected directly to the input shaft 116a, the power input component 78 of the first embodiment is eliminated from this design. Thus, the input sheave 106 is eliminated from the design of the second embodiment.

It is believed that the overall operation of this second embodiment is evident in view of the description of the first embodiment, so that will not be described in this portion of the text.

Also, while only a gasoline motor and an electric motor have been shown as a power source, it is to be recognized that within the broader scope of the present invention, and that particularly with improvements being made in alternative power sources, that some other power source could be incorporated advantageously in the present invention.

A third embodiment of the present invention will now be described with reference to FIGS. 7–11. Components of this third embodiment which are similar to (or the same as) components of the first and second embodiments will be given like numerical designations with a "b" suffix distinguishing those of this third embodiment.

This third embodiment is, in its basic operation, substantially the same as in the first embodiment. This third embodiment differs from the first embodiment in two respects. First, the position of some of the components have been rearranged. Second, the housing sections of the speed-reducing gear section 64b and the power-assist output section 66b have been modified so that the output drive of the speed-reducing gear section 64b and the input drive of the power-assist output section 66b have been rearranged so that the drive chain 168b and the adjacent portions of the speed-reducing gear section 64b and the power-assist output section 66b are enclosed in the housing.

Figure 7:
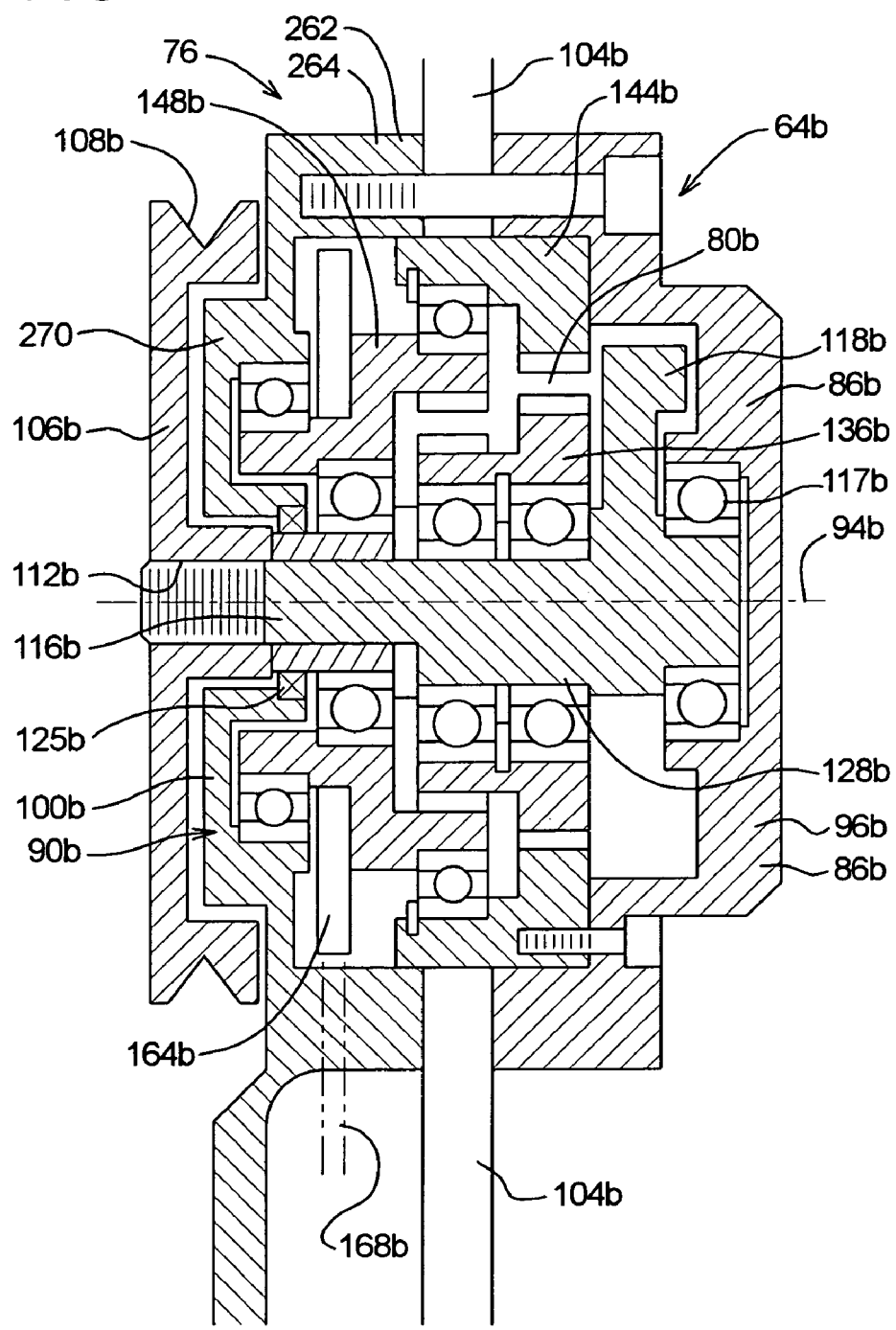
FIG. 7 is a sectional view similar to FIG. 3, but showing the speed-reducing gear section of a third embodiment of the present invention.

Reference is first made to FIG. 7 which shows the speed-reducing gear section 64b. In comparing FIG. 7 of the second embodiment with FIG. 3 of the first embodiment, it will immediately be recognized that the input sheave 106b of the second embodiment is on the left side of the speed-reducing gear section 64b (as seen in FIG. 7), while the input sheave 106 of the first embodiment (as shown in FIG. 3) is on the right-hand side of the drawing. After further examination, it will also be recognized the other operating components are positioned and configured in substantially the same way as shown in FIGS. 3 and 7. Thus, the speed-reducing gear assembly 80b is substantially the same as in the first embodiment, and there is a rear housing section 86b which supports the rear end of the drive shaft 116b by means of a rear end bearing 117b. Also, the shaft 116b has the eccentric shaft portion 128b that causes the orbital movement of the cluster gear section 136b. There is also the fixed ring gear 146b and the rotatably mounted ring gear 148b that is driven at a relatively slow rotational speed. There is a single counter weight 118b and a second counter weight could be added to this third embodiment, but that is optional.

Also, the output sprocket 164b is positioned similarly to the positioning in the first embodiment, and there is a drive chain 168b extending downwardly and through openings in the lower housing section.

In this third embodiment, there is a forward housing section 90b, but in this third embodiment, this housing section 90b is made as part of a larger housing section 260b that is shown in FIGS. 10 and 11. This housing section 260b serves the function of providing the forward housing sections for both the speed-reducing gear section 64b and also for the power-assist output section 66b. Further, this housing section 260b forms with a mounting plate section 104b an enclosure surrounding the drive chain 168b, and essentially making the output drive of the speed-reducing gear section and the input drive of the power-assist output section a single chamber so that lubricating fluid can circulate between the speed-reducing gear section 64b and the power-assist output section 66b.

To return now to examining the speed-reducing gear section 64, as can be seen in FIG. 7, the forward end of the drive shaft 116b has a forward threaded end portion which fits in the threaded opening 112b of the sheave 106b and extends rearwardly therefrom so that the forward end of the shaft 116b is supported by the forward bearing 117b. Aside from that change, the shaft 116b performs substantially the same function that it did in the first and second embodiments.

With regard to the other components of the speed-reducing gear section 64b, it is believed that there is no need to go further in the description of the components shown in FIG. 7, since their construction and operation would be apparent from the earlier description of the first embodiment.

Figure 8:
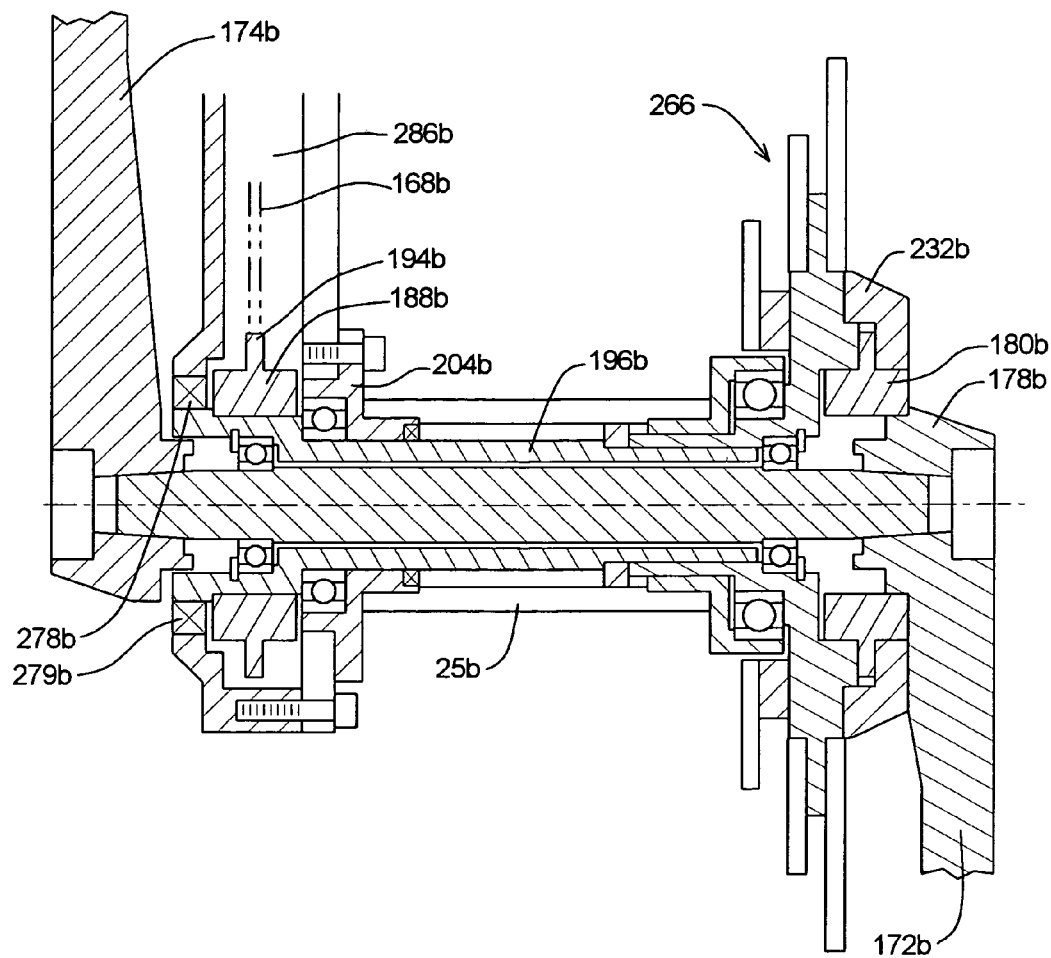
FIG. 8 is a sectional view showing the power-assist output section of the third embodiment, this view being similar to what is shown in the bottom half of FIG. 5 relative to the first embodiment.

With reference to FIG. 8, there will now be a description of the power-assist output section 66b. As in the first embodiment, this power-assist output section 66b comprises a crank housing 25b, a crank shaft 170b, and the power-assist shaft 190b surrounding the crank shaft 170b and positioned within the crank housing 25b.

As in the first embodiment, there is at the right side of FIG. 8 the hub 178b within which is positioned the freewheeling clutch 180b that connects to the crank shaft 170b. In the left-hand part of FIG. 8, there is the freewheeling clutch 188b which has sprocket teeth 194b which in turn engage the chain 168b.

The remaining operating components of the power-assist output section 66b will not be described, since these are substantially the same (or closely similar to) corresponding components of the first embodiment, and their configurations and modes of operation will be readily apparent from a review of the description of the first embodiment.

Figure 9:
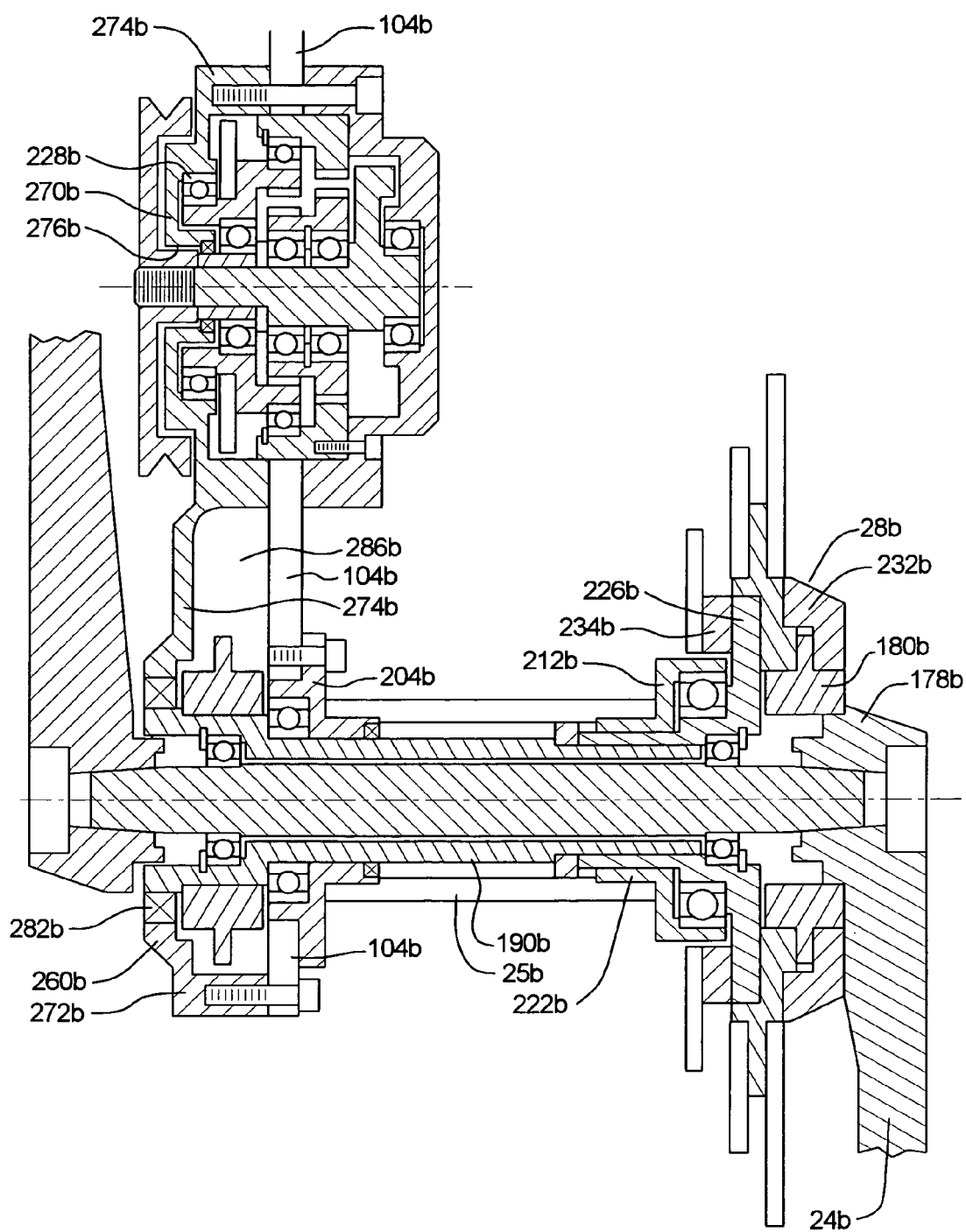
FIG. 9 is a view similar to FIG. 5 of the first embodiment, but showing the speed-reducing gear section and the power-assist output section of the third embodiment.

Reference is now made briefly to FIG. 9, which shows both the speed-reducing gear section 64b and the power-assist output section 66b interconnected with one another. Since both of these components have been described previously with reference to FIGS. 7 and 8, there will not be any detailed description of these components as shown in FIG. 9. However, reference will be made back to FIG. 9 in describing the structure and functioning of the earlier mentioned housing structure 260b which has been added in this third embodiment.

With reference with FIGS. 10 and 11, the housing structure 260b comprises a perimeter flange 262b and a plate section 263b surrounded by the perimeter flange 262b. This flange 262 has a semicircular curved upper portion 264b, a semicircular lower flange section 266, and two straight side portions 268 so as to have an overall "race track" configuration.

The housing structure 260b can be considered as having three section, namely an upper section 270b, a lower section 272b, and an intermediate section 274b.

The upper section 270b functions to enclose the forward portion of the speed-reducing gear section 64b. Thus, as can be seen in FIG. 7, the upper section 270b includes the aforementioned front housing section 90b which is, in this third embodiment, an integral part of the housing structure 260b. Thus, it can be seen in FIG. 7 that the upper flange portion 264b comprises part of this upper section 270b. As can be seen in FIGS. 10 and 11, the upper section 270b has a center through opening 276 which is sized to receive the shaft 116b and also the perimeter seal 125b. A cylindrical wall portion 278b defines this opening 276b. Then surrounding this wall 278b is an annular recess 280b which receives a forward extension of the rotatable ring gear 148b, and also the bearing in which it is supported.

The lower housing section 272b has a relatively large circular opening 282b. It can be seen by examining FIG. 8 that this opening 278b encircles an end seal 279b that in turn surrounds and engages the extreme forward end of the power-assist shaft 190b.

Reference is now made to FIG. 9 which illustrates the total housing structure 260b connected to both the speed-reducing gear section 64b and the power-assist output section 66b. It can be seen that the aforementioned mounting plate 104b is positioned to interconnect the speed-reducing gear section 64b and the power-assist output section 66b in conjunction with the housing structure 260b. Also, the mounting plate 104b and the housing structure 274b join together at perimeter portions thereof to form an intermediate chamber 286 which extends between the output sprocket 164b and the sprocket teeth 194b formed as part of the clutch 188b. This chamber 286b enables the lubricant to circulate entirely around both of these sprocket members and also in the chamber through which the drive chain 168b extends.

Also, it should be recognized that with the motor 68b being operated at a very high RPM, the torque of the output of the motor 68b is relatively very small compared to the torque at the output of the speed-reducing section. Thus, the tension force on the drive belt 74b is relatively very low.

One of the advantages of the present invention is, as mentioned previously, that the power-assist apparatus 60b of the present invention can easily be incorporated in a typical prior art bicycle. The apparatus 60b can be provided in the form of a retrofit kit. To install the apparatus 60b, the forward sprocket section 28b would be disengaged from the drive chain 30b and the pedal section 24b, and the forward sprocket section 28b would be removed from the bicycle 10b. The speed-reducing gear section 64b, the housing structure 260b, the mounting plate 104b, and the power-assist shaft 190b could be preassembled in the kit and thus be ready for being mounted to the bicycle as a preassembled unit.

To begin the installation of the power-assist apparatus 60b, the left adapter 204b would be threaded into the left end of the crank shaft 25b. Then the preassembled unit (i.e. the speed-reducing gear section 64b, the housing structure 260b, the mounting plate 104b, and the power-assist shaft 190b) would be installed in the bicycle by inserting the power-assist shaft 190b through the adapter 204b and into the crank housing 25b. After this, the mounting plate 104b would be bolted to the adapter 204b. Then the components on the right-hand side of the crank housing 25b could be installed.

More specifically, the right-side adapter 212b would be threaded into the right end of the crank housing 25b. After this, the sprocket connecting member 222b could be threaded onto the right end of the power-assist shaft 190b. It will be noted (with reference to both FIGS. 8 and 9) that there is provided a spacer 290b at the left end of the sprocket connecting member 222b. This spacer 290b is provided selectively to match the dimensions of the crank housing so that the sprocket connecting member 222b would be properly placed. This spacing member 290b could be a single integral piece, with these being provided in several sizes to match the dimensions of that particular crank housing 25b, or the spacer 290b could be provided as a plurality of washers which could be stacked together to arrive at the proper dimension of the spacer 290b. The spacer or spacers 290b would be inserted into the crank housing prior to the connection of the right end adapter 212b being made through the crank housing 25b.

With the above steps being accomplished, then the remainder of the installation could proceed. More specifically, the crank shaft 170b could be positioned within the power-assist shaft 190b, and the remaining components of the forward sprocket section 28b would be installed and the remaining components of the pedal section 24b would be installed. Obviously, the sequence of the steps in the installation could be arranged in various ways.

It is to be understood that various modifications can be made to the present invention without departing from the basic teachings thereof. For example, the configuration of various drive components, positioning of the components, attachments, or other components could be added or modified in various ways and still accomplish the basic functions shown herein. These are to be included within the scope of the present invention.

I claim:

1. A pedal- and motor-assist power system for a bicycle which has, at least one drive wheel, and a bicycle frame with front and rear ends, said system comprising:
    a) a pedal section comprising:
        i. first and second pedal members;
        ii. a crank shaft connecting the pedal members;
        iii. a crank housing in which the crank shaft is located;
    b) a sprocket section having a chain-and-sprocket drive connection to said drive wheel;
    c) a motor section;
    d) a speed-reducing gear section connecting to said motor section and having a gear section drive output;
    e) a power assist drive section comprising a power assist drive member concentrically mounted around said crank shaft and having a power-assist drive connection between the gear section drive output and the sprocket section;

f) said system being characterized in that the sprocket section has a first pedal overrunning drive connection with said pedal section and the power-assist drive connection has a second overrunning drive connection; whereby said bicycle is able to operate in four operating modes, namely:
   i. a power-assist mode where a bicycle rider is pedaling to supply power, and the power-assist section is providing power;
   ii. a pedal-only mode where power is being supplied solely by pedaling the bicycle;
   iii. the power-assist-only mode where the bicycle rider is not providing power by pedaling, but power is supplied by the power output section;
   iv. a coasting no-power mode where the bicycle is traveling with the pedal section stationary, and no power is being supplied by either the pedal section or the power-assist drive section, and g) said power-assist drive member having a fixed drive connection to the sprocket section and the power-assist-overrunning drive connection is between the power-assist drive member and the gear section drive output.

2. A pedal- and motor-assist power system for a bicycle which has, at least one drive wheel, and a bicycle frame with front and rear ends, said system comprising:
   a) a pedal section comprising:
     i. first and second pedal members;
     ii. a crank shaft connecting the pedal members;
     iii. a crank housing in which the crank shaft is located;
   b) a sprocket section having a chain-and-sprocket drive connection to said drive wheel;
   c) a motor section;
   d) a speed-reducing gear section connecting to said motor section and having a gear section drive output;
   e) a power assist drive section comprising a power assist drive member concentrically mounted around said crank shaft and having a power-assist drive connection between the gear section drive output and the sprocket section;
   f) said system being characterized in that the sprocket section has a first pedal overrunning drive connection with said pedal section and the power-assist drive connection has a second overrunning drive connection; whereby said bicycle is able to operate in four operating modes, namely:
     i. a power-assist mode where a bicycle rider is pedaling to supply power, and the power-assist section is providing power;
     ii. a pedal-only mode where power is being supplied solely by pedaling the bicycle;
     iii. the power-assist-only mode where the bicycle rider is not providing power by pedaling, but power is supplied by the power output section;
     iv. a coasting no-power mode where the bicycle is traveling with the pedal section stationary, and no power is being supplied by either the pedal section or the power-assist drive section, and
   g) said power-assist drive member having a tubular configuration with first and second power-assist member portions on opposite sides of the bicycle, said power-assist drive member and said crank housing being positioned concentrically around a center axis of said crank shaft.

3. The system as recited in claim 2, wherein the second end portion of the power-assist drive member has a fixed power connection to the drive sprocket, and the first end portion of the power-assist drive member connects with the gear section drive output through said power-assist overrunning drive connection.

4. The system as recited in claim 3, wherein said power-assist drive member is rotatably mounted on bearings that have an operative load-bearing relationship with said crank housing, and said crank shaft is at least in part supported by bearings in load-bearing relationship with said power-assist drive member so that said power-assist drive member and said crank shaft are rotatable relative to one another.

5. A pedal- and motor-assist power system for a bicycle which has, at least one drive wheel, and a bicycle frame with front and rear ends, said system comprising:
   a) a pedal section comprising:
     i. first and second pedal members;
     ii. a crank shaft connecting the pedal members;
     iii. a crank housing in which the crank shaft is located;
   b) a sprocket section having a chain-and-sprocket drive connection to said drive wheel;
   c) a motor section;
   d) a speed-reducing gear section connecting to said motor section and having a gear section drive output;
   e) a power assist drive section comprising a power assist drive member having a power-assist drive connection between the gear section drive output and the sprocket section;
   f) said system being characterized in that the sprocket section has a first pedal overrunning drive connection with said pedal section and the power-assist drive connection has a second overrunning drive connection; whereby said bicycle is able to operate in four operating modes, namely:
     i. a power-assist mode where a bicycle rider is pedaling to supply power, and the power-assist section is providing power;
     ii. a pedal-only mode where power is being supplied solely by pedaling the bicycle;
     iii. the power-assist-only mode where the bicycle rider is not providing power by pedaling, but power is supplied by the power output section; and
     iv. a coasting no-power mode where the bicycle is traveling with the pedal section stationary, and no power is being supplied by either the pedal section or the power-assist drive section,
   g) said motor being a high-speed motor that is driven by petroleum-based fuel and operates at least 1000 RPM, said motor having a sheave-and-belt drive connection with said speed-reducing gear section, whereby tension forces exerted on the sheave-and-belt drive from the motor to the speed-reducing gear section are substantially less than forces imposed in the drive connection between the speed-reducing gear section and the power-assist drive member.

6. The system as recited in claim 5, wherein said motor is located proximate to an upper rear portion of said frame, and said speed-reducing gear section is located closely adjacent to said crank housing, so that a first distance of the motor to the speed-reducing gear section is substantially greater than a distance from the speed-reducing gear section to the crank housing.

7. A pedal- and motor-assist power system for a bicycle which has, at least one drive wheel, and a bicycle frame with front and rear ends and first and second sides, said system comprising:

a) a pedal section comprising:
  i. first and second pedal members;
  ii. a crank shaft connecting the pedal members;
  iii. a crank housing in which the crank shaft is located;
b) a sprocket section having a chain-and-sprocket drive connection to said drive wheel;
c) a motor section;
d) a speed-reducing gear section connecting to said motor section and having a gear section drive output;
e) a power assist drive section comprising a power assist drive member concentrically mounted around said crank shaft and having a power-assist drive connection between the gear section drive output and the sprocket section;
f) said system being characterized in that the sprocket section has a first pedal overrunning drive connection with said pedal section and the power-assist drive connection has a second over-running drive connection; whereby said bicycle is able to operate in four operating modes, namely:
  i. a power-assist mode where a bicycle rider is pedaling to supply power, and the power-assist section is providing power;
  ii. a pedal-only mode where power is being supplied solely by pedaling the bicycle;
  iii. the power-assist-only mode where the bicycle rider is not providing power by pedaling, but power is supplied by the power output section;
  iv. a coasting no-power mode where the bicycle is traveling with the pedal section stationary, and no power is being supplied by either the pedal section or the power-assist drive section, and
g) said sprocket section and said first pedal member being nearer to a second side of the frame, and said power-assist drive member having a second end portion that connects to said sprocket drive, and a first end portion that is nearer to a first side of the frame, said first end portion connecting through the power-assist overrunning drive connection to the gear section drive output.

8. A pedal- and motor-assist power system for a bicycle which has, at least one drive wheel, and a bicycle frame with front and rear ends, said system comprising:
  a) a pedal section comprising:
    i. first and second pedal members;
    ii. a crank shaft connecting the pedal members;
    iii. a crank housing in which the crank shaft is located;
  b) a sprocket section having a chain-and-sprocket drive connection to said drive wheel;
  c) a speed-reducing gear section connecting to said motor section and having a gear section drive output;
  d) a power assist drive section comprising a power assist drive member concentrically mounted around said crank shaft and having a power-assist drive connection between the gear section drive output and the sprocket section;
  e) a high-speed motor that is driven by petroleum-based fuel and operates at least 1000 RPM, said motor having a sheave-and-belt drive connection with said speed-reducing gear section, whereby tension forces exerted on the sheave-and-belt drive from the motor to the speed-reducing gear section are substantially less than forces imposed in the drive connection between the speed-reducing gear section and the power-assist drive member.

9. A pedal- and motor-assist power system for a bicycle which has, at least one drive wheel, and a bicycle frame with front and rear ends, said system comprising:
  a) a pedal section comprising:
    i. first and second pedal members;
    ii. a pedal drive housing which is mounted in the frame at a drive location, with said pedal members being mounted to said housing;
  b) a sprocket section at said drive location and having a drive connection to said drive wheel;
  c) a motor section mounted at a motor location of said bicycle that is spaced from said drive location;
  d) a speed-reducing gear section connecting to said motor section and having a gear section drive output, said speed reducing gear section being located at a speed reducing gear section location that is spaced from said drive location and motor location;
  e) a power assist drive section comprising a power assist drive member concentrically mounted around said crank shaft and having a power-assist drive connection between the gear section drive output and the sprocket section;
  f) said system being characterized in that the sprocket section has a first pedal overrunning drive connection with said pedal section and the power-assist drive connection has a second overrunning drive connection; whereby said bicycle is able to operate in four operating modes, namely:
    i. a power-assist mode where a bicycle rider is pedaling to supply power, and the power-assist section is providing power;
    ii. a pedal-only mode where power is being supplied solely by pedaling the bicycle;
    iii. the power-assist-only mode where the bicycle rider is not providing power by pedaling, but power is supplied by the power output section; and
    iv. a coasting no-power mode where the bicycle is traveling with the pedal section stationary, and no power is being supplied by either the pedal section or the power-assist drive section,
  g) said power-assist drive member having a fixed drive connection to the sprocket section and the power-assist-overrunning drive connection is between the power-assist drive member and the gear section drive output.

* * * * *